United States Patent [19]

Kennedy et al.

[11] Patent Number: 5,518,795
[45] Date of Patent: May 21, 1996

[54] LAMINATED HOOK FASTENER

[75] Inventors: William J. Kennedy; George A. Provost, both of Manchester; Gerald F. Rocha, Bedford, all of N.H.

[73] Assignee: Velcro Industries, B.V., Netherlands

[21] Appl. No.: 319,267

[22] Filed: Oct. 6, 1994

Related U.S. Application Data

[60] Continuation of Ser. No. 80,348, Jun. 21, 1993, abandoned, which is a division of Ser. No. 747,876, Aug. 16, 1991, Pat. No. 5,260,015.

[51] Int. Cl.⁶ ........................................ B32B 3/06
[52] U.S. Cl. .................. 428/100; 24/306; 24/442; 24/445; 24/447; 24/448; 24/450; 24/452; 428/99; 428/254; 428/260; 428/261; 428/290
[58] Field of Search ............... 428/99, 100, 245, 428/254, 260, 261, 274, 290, 306.6, 308.8, 308.4, 318.4, 479.6, 481, 511; 24/452, 450, 448, 447, 445, 442, 306

[56] References Cited

U.S. PATENT DOCUMENTS

| | | |
|---|---|---|
| 3,312,583 | 4/1967 | Rochlis ................................ 161/62 |
| 3,594,863 | 7/1971 | Erb .......................................... 425/115 |
| 3,594,865 | 7/1971 | Erb .......................................... 425/115 |
| 3,758,657 | 9/1973 | Menzin et al. ....................... 264/167 |
| 3,843,760 | 10/1974 | Teed ....................................... 264/243 |
| 4,097,634 | 6/1978 | Bergh .................................... 428/156 |
| 4,726,975 | 2/1988 | Hatch ..................................... 428/120 |
| 4,784,890 | 11/1988 | Black ..................................... 428/120 |
| 4,872,243 | 10/1989 | Fischer .................................. 264/167 |
| 4,931,344 | 6/1990 | Ogawa ................................... 428/100 |
| 4,933,224 | 12/1990 | Hatch ..................................... 428/100 |

FOREIGN PATENT DOCUMENTS

| | | | |
|---|---|---|---|
| 2082591 | 12/1971 | France | ................................ 428/99 |
| 1937746 | 5/1970 | Germany . | |
| 2017522 | 12/1971 | Germany . | |
| 52-18228 | 5/1977 | Japan . | |

*Primary Examiner*—Nasser Ahmad
*Attorney, Agent, or Firm*—Fish & Richardson

[57] ABSTRACT

An extruded hook fastener strip is created on a roll having hook forming cavities in its surface by extruding plastic material into the interface between the forming roll and a second strip carried by a backing roll. The second strip is firmly bonded to the fastener strip on that side opposite the formed hooks.

6 Claims, 4 Drawing Sheets

LAMINATED HOOK FASTENER

This is a continuation of copending application Ser. No. 08/080,348, filed Jun. 21, 1993, now abandoned, which was a divisional of application Ser. No. 07/747,876, filed Aug. 16, 1991, now issued as U.S. Pat. No. 5,260,015.

This invention relates to an improved fastener of the hook and loop type and a method for producing the same using a combined extrusion/roll forming process. The assignee of this application is owner of U.S. Pat. No. 4,775,310 which describes an apparatus for making a separable fastener and U.S. Pat. No. 4,872,243 which describes the product produced by the apparatus of the former patent. Striplike fasteners of the type described in the subject patents comprise a great multiplicity of closely spaced upstanding hooklike projections to releasably engage loops of a companion fastener strip to form a cyclable or semi-permanent closure sold in the trade under the brand name Velcro®. Depending upon the configuration of the multi-hook fastener, many different types of material are adapted for coaction therewith to effect joining of the structures to which the strip fasteners are themselves joined. Such fastener devices are finding broad usage in such diverse applications as securing automotive seat covers to foamed seat buns, closures for food bags, the application of armor to military vehicles and holding down floor coverings to floors.

Each of the recited applications and many more, well known to those skilled in the art, require the fastener to be permanently attached to a second article such as a piece of textile fabric, a seat bun, a floor or the flap of a paper bag. Sewing, however, is limited as to the nature of the material to which the fastener may be attached. Adhesive systems have long been used as a principal method of attaching fasteners to other objects as well. U.S. Pat. No. 3,773,580 discloses a method of securing a fastener member to a substrate by first applying a synthetic resin adhesive to one side of the base of a fastener, opposite the side containing the upstanding engaging elements, and then applying an adhesive to the substrate. Thereafter the adhesive coating on the fastener is activated. The two adhesive coated surfaces are brought together in face to face relationship to firmly affix the fastener member to the substrate. The subject patent teaches that "in order to securely bond an adhesive to the tape member it is preferred that the opposite surface of the tape member have a suitable base coat which would provide for a secure bond between the tape member and the adhesive". U.S. Pat. No. 3,726,752 instructs that in preparing adhesive laminates, wherein synthetic resin based adhesive is laminated to a web of polyamide polymer, it was found that strong bonding between the polyamine substrate and the adhesive lamina were difficult to achieve, and the prior art is "well-studded with attempts to overcome this problem". This patent overcomes such difficulties by treating the polyamide web with primer coating consisting of a complex chemical mixture in a solvent medium to render an improved bonding surface. Many patents, including U.S. Pat. Nos. 2,349,290 and 3,060,070 and 3,111,448 and 2,766,164, describe methods for bonding poly(amide) polymer to specific surfaces primarily natural or synthetic rubber. All of these teachings rely upon chemical means for enhancing the ability to bond to the surface of a sheet or fibrous material.

Many plastic fastener tapes are produced from plastic materials possessing the minimum strength and resiliency essential to the proper functioning of the hooklike projections. Customarily the side of the fastener tape opposite the upstanding hooks is a smooth, flat, uniform and regular surface difficult to bond, as is well documented in the prior art. Such difficulties present particular problems for hook and loop fasteners. This class of products are convenience products and if it is necessary to apply complex chemical treatments to the tape prior to bonding the convenience advantage is lost. It is known to apply pressure sensitive adhesives to such fasteners by the application of corona treatments in the manufacturing facilities where the fastener tapes are manufactured but such treatments are not available for many users and do not present a reasonable solution for creating a fastener surface which is readily bondable to a wide variety of surfaces using a wide range of adhesive types. U.S. Pat. No. 3,594,865 describes an apparatus for continuously forming a flexible web with molded protuberances of plastic material incorporated in a base web. The base of the web is either a porous woven or nonwoven fabric, or an extruded film. The supporting fabric is impregnated with molten plastic simultaneously as hooks are formed. While U.S. Pat. No. 3,594,865 is sparse in detail concerning the nature of the product formed from the apparatus it does characterize the impregnation of the base fabric as complete, stating in appropriate part, "a liquid moldable plastic material, for example a molten plastic, is injected into the hook molding recesses of the wire and also onto the surface and into the interstices of the base fabric which lies on the surface of the drum." The base fabric passes under a nozzle which impregnates it with the same plastic used to inject the dies used to form the plastic hooks with the clear implication the porous base web is completely saturated with the plastic. This is considerably different from the products of the present invention wherein the process controls the distribution of plastic into the backing material to a degree necessary to firmly hold the backing material to the base of the hook sheet but does not encase the backing to destroy it's aesthetic characteristics as a functioning backing material to modify the back surface of the fastener. The backing of U.S. Pat. No. 3,594,865 is primarily a support onto which hooks are formed and does not modify the backing of the fastener to receive adhesives or gluing agents nor is it possible to utilize loop materials as the backing material to form back to back fasteners. It is also known to use complex laminating methods to add a bondable surface to many sheet materials but such methods are expensive and often create a final product which has undesirable characteristics such as bulk, stiffness, a tendency to delaminate, operating temperature limitations or other properties making the laminate undesirable.

A product using such techniques, well known in the art of hook and loop fasteners, is the so called back to back fastener. Such a product is created by taking a hook fastener and a loop fastener and bonding the two together in a back to back relationship such that the resulting laminate has hooks on one side and loops on the other side. Such a combination finds wide use in many strapping operations such as wire ties, plant ties and fastener straps for holding splints and the like in place. The limitation of such products in the past has focused on the method used to laminate the two components together as described above. The bulk created by the adhesive-bonding of such laminates has clearly limited its usefulness.

Therefore it is the object of the present invention to produce a hook portion of a hook and loop fastener system which has a surface opposite the surface containing the upstanding hooks substantially modified in its characteristics from the customary flat, smooth, even surface which has little compatibility for bonding to other materials. A further objective of the invention is to create a surface on the back of a base of a plastic hook and loop fastener which will readily accept bonding agents such as adhesives, glues, cements and the like without special treatment of the surface. It is a further objective of the invention to create a loop surface on the back portion of the base of a plastic hook fastener which is capable of engaging into hooks on the front surface thereof to form a back to back laminate with less bulk, stiffness and thickness.

BRIEF SUMMARY OF THE PRESENT INVENTION

The process described in U.S. Pat. No. 4,794,028 for making plastic hooks utilizes an apparatus described in U.S. Pat. No. 4,775,310 comprising "a first cooled unitary forming roller having a plurality of hook forming cavities defined in the periphery thereof and extending inwardly therefrom; a second pressure roller positioned for coaction with said first forming roller; means for concurrently rotating said first and second rollers in opposite directions about their generally respective axis; means for forming a striplike extrusion of molten plastic material adjacent said first and second rollers to be directed therebetween at an interface thereof such that said plastic material fills said hook forming cavities and forms a striplike member having a base portion and a great multiplicity of hooklike projections extending from one surface of said base portion and integral therewith; means for removing said striplike member from said first forming roller at a position spaced from the interface of said first and second rollers such that said hooklike projections are withdrawn from said hook forming cavities without opening said cavities after being cooled by the first forming roller to a desired temperature." We have found it possible to introduce into the nip, formed by the two cylinders, various sheet materials which will become an integral part of the striplike material on the side opposite the hooks. Surprisingly, introduction of such materials into the nip along with the molten plastic does not interfere with the operation of the process and while certain cautions and limitations are, of course, desirable, the formation of such in situ laminates proceeds to great advantage.

Thus, according to one aspect of the invention, in an elongated, striplike fastening member having a base member and a multiplicity of hooklike engaging elements in the form of projections upstanding therefrom, the hooklike projections each having a stem supported at one end thereof on said base member and a radial extension on the unsupported end of said stem, the hooklike projections and the base member being composed of the same polymeric material, the improvement comprises an in-situ laminate wherein the base member is integrally joined with a fibrous, sheetlike material, without the use of adhesives, on the side of the base member opposite the side containing the hook-like projections, the polymer forming the base member being comingled with and encapsulating at least some of the surface fibers on one side of the sheetlike fibrous material while leaving other fibers on the opposite surface free of the polymer. We have found a very wide variety of materials, such as nonwoven fabrics, woven and knitted textiles, reinforcing yarns, scrims and nettings, sheets of paper, plastic films, metallic window screening and almost any material in filmlike or thin sheet form can be handled in this manner. The formation of the striplike plastic fastener sheet in situ with a porous foreign backing most often is accomplished by infusion of the molten plastic into the structure of the web material where there is an intimate intermingling of the plastic within the pores of the web. In the case of non-porous films, the films tend to melt on their surface forming an intermolecular diffusion which forms a strong bond between the sheets. The inclusion of such foreign materials provides a substantial advantage over prior art methods of creating laminates. Such striplike materials contain no foreign material such as adhesive; the bonds are strong and a wide range of materials may be joined in this way. Additionally, the process of adding the backing at the time of creating the hooks offers economic advantages over the more conventional processes of creating a laminate using adhesives or other bonding agents in second stage processes.

BRIEF DESCRIPTION OF THE DRAWINGS

In order to more fully understand the invention, reference should be had to the following detailed description taken in conjunction with the attached drawings, wherein.

SUMMARY OF THE INVENTION

Figure 1:
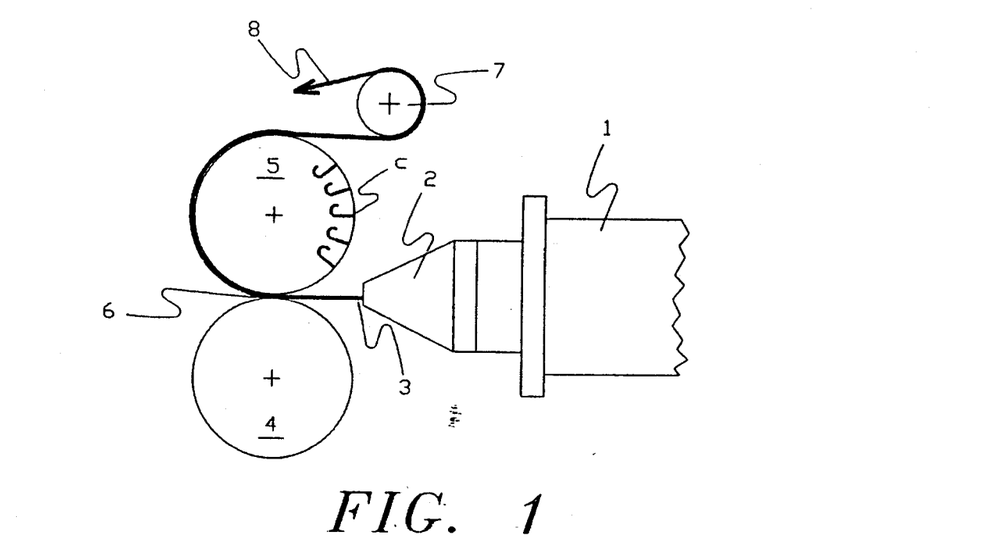
FIG. 1 is a schematic sectional view of the apparatus used in the prior art for creating the plastic fastener hook tape of the prior art.

FIG. 1 is a cross-sectional view of the apparatus used in the prior art for creating the plastic fastener hook tape of the prior art. Extruder barrel 1 melts and forces the molten plastic 3 through die 2 into the nip 6 between base roller 4 and cavity roller 5 containing cavities to form the hooks of a strip fastener of the well known hook and loop type. The strip fastener material formed in the nip 6 travels around the periphery of the cavity roller 5 and around stripping roller 7, which assists in pulling the formed hook sheet 8 from the cavity roll, and thence to a windup device, not shown.

Figure 2:
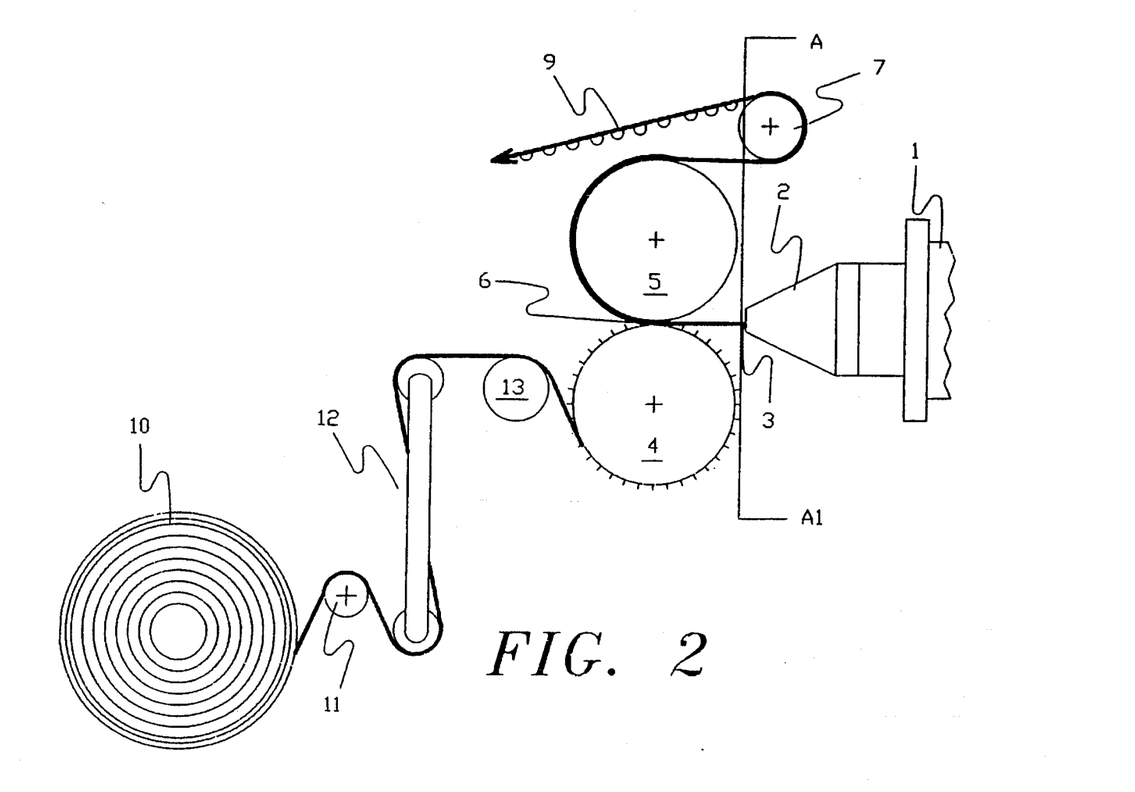
FIG. 2 is a schematic sectional view of the apparatus of FIG. 1 which is modified in accordance with the present invention.
Figure 3:
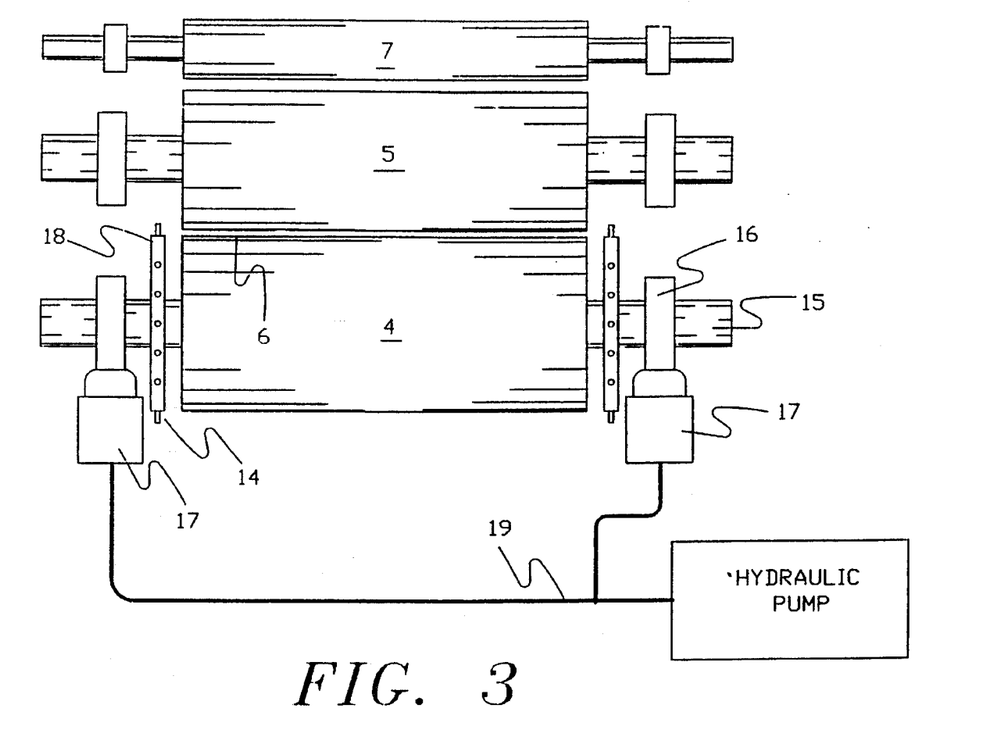
FIG. 3 is a schematic rear view of the forming roll arrangement of FIG. 2.

While many methods of feeding sheet material to the forming section of the hook forming device are possible FIG. 2 illustrates a device particularly well adapted to that purpose. I have found that by introducing a preformed sheet material 10 into the nip 6 at the same time molten plastic 3 is forced into the nip 6 to create the strip fastener tape, the sheet material will bond intimately with the fastener, without using adhesives, to become an integral part of the structure of the strip fastener. As in FIG. 1, extruder 1 forces molten plastic 3 through die 2 into nip 6 between rolls 4 and 5. However, we have added at the edges and around the periphery of backing roller 4 a set of pins which will carry the sheet material 10 into the nip 6 in a flat, unwrinkled state. It is important to maintain a smooth, wrinkle free, properly tensioned sheet in order to form a smooth, even laminate backing for the fastener. To assure proper tensioning and alignment of the secondary sheet material, a roll of the secondary material 10 is mounted on a let off device and threaded around diversion roller 11 into a web straightening device 12, well known in the art as typically sold by the Fife Manufacturing Company which assures the edge of the web of sheet material is centered as it is fed onto backing roller 4 around scroll roll 13, composed of ribs of elastomeric material to firmly grip the sheet and impinge it against the backing roller 4 and onto pins 14. Pins 14 and roller 4 deliver the web into nip 6 along with molten plastic 3. As the molten plastic 3 is forced by the pressure imposed upon it by the narrow space of the nip 6, it flows into cavities in cavity roller 5 and also into any pores present in the sheet material being carried by the backing roller 4. In this way the web sheet 10 is intimately joined to the forming hook sheet 8 and becomes an integral part thereof to form a laminated sheet 9. FIG. 3 is a rear view of the forming roll stack along line A,A1. The backing roller 4 is supported on shaft 15 which is held by bearing 16 in its proper place in side plates, not shown. Bearing 16 is connected to hydraulic lines 19 from a hydraulic pump located remotely from the roll stack. The pins 14 are held by hub 18 which is fitted to the shaft 15 holding the backing roller 4. It is possible to incorporate the pins 14 directly into the backing roller 4 but we prefer to utilize separate pin holding hubs which afford some degree of flexibility in utilizing various size and shape pins for differing sheet materials.

The customary procedure for operating the apparatus described is to thread up the secondary backing 10 through the machine, start the extruder 1 so that plastic 3 is flowing smoothly through the die 2 and then move the lips of the die 2 into proximity of the nip 6 between the two forming rollers 4 & 5. The molten plastic is picked up by the backing roller 4 and delivered into the nip 6 as pressure from the hydraulic cylinders 17 raises the backing roller 4 into position. As the gap 6 between the backing roller 4 and the cavity roller 5 is reduced, the molten plastic 3 flows into the nip 6 and is forced into the open cavities in the forming roll 5. Molten plastic is also forced into the pores of the backing material 22, penetration depending upon the thickness of the backing, the pore structure of the backing, the viscosity of the molten plastic and the pressure of the plastic in the nip. The pressure in the nip 6 is a function of the hydraulic pressure used to close the rollers 4 & 5 and the quantity of material delivered into the nip 6 relative to the quantity consumed in forming the backing and filling the cavities.

Figure 4:
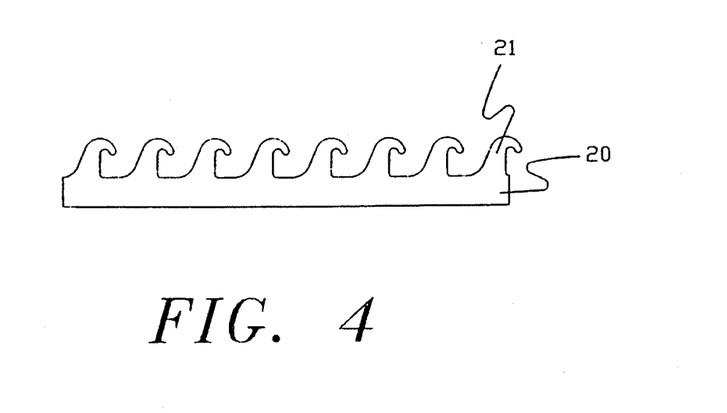
FIG. 4 is a schematic cross-sectional view of the hook fastener tape formed by the prior art process.
Figure 5:
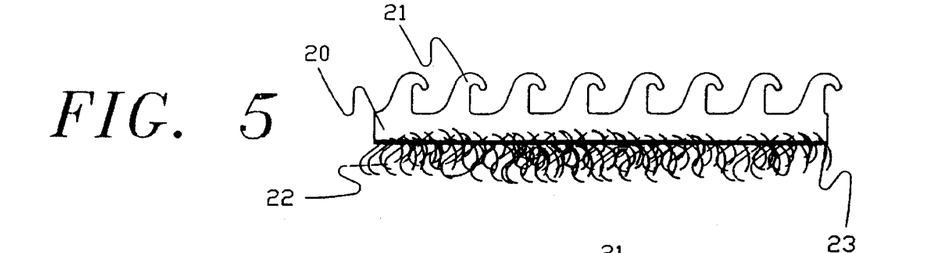
FIG. 5 is a schematic cross-sectional illustration of one embodiment of the invention.
Figure 5A:
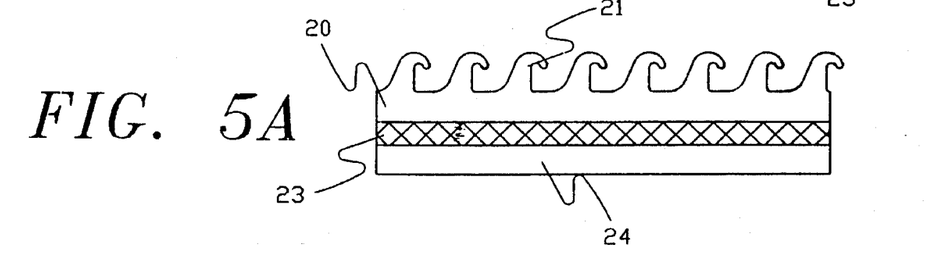
FIG. 5A is another schematic illustration of the product of FIG. 5.

FIG. 4 is a cross-section of the hook fastener tape formed by the prior art process. The hook tape consists of a base 20 and hooks 21 projecting from the base. The plastic material forming the tape is essentially uniform throughout. FIG. 5 is one embodiment of a product of this invention created by introducing a nonwoven fabric into the nip of the forming rolls as described above. Base 20 containing hooks 21 projecting therefrom is attached nonwoven fabric 22. At the interface 23 between the two layers the plastic from the fastener flows around and entraps some of the fibers of the nonwoven 22 thereby bonding the nonwoven fabric to form a laminate of the two layers with a continuous interface formed by the fibers interpenetrating and co-mingling with the solidified plastic resin, as shown in FIG 5. The nonwoven may be light or heavy, thin or thick, dense or open. The properties of the nonwoven, the pressure exerted and the viscosity of the plastic in the nip will determine the degree to which the plastic flows into the fibrous network, or put alternately, the degree to which the nonwoven will imbed into the plastic. FIG. 5a is a schematic representation of the laminate of FIG. 5 where the layer 23 represents the continuous zone of mixed fabric and plastic. It should be understood this layer is not of uniform cross-section but rather there is a gradient concentration across this layer ranging from no fibers at the bottom of the plastic layer 20 to no plastic at the top of the fiber layer 24. If, on the other hand, the nonwoven web is thick and dense, the plastic will only marginally penetrate into the nonwoven and the back side of the fastener will have the appearance of the free standing fibrous nonwoven. By carefully selecting the fibrous nonwoven web, the plastic for forming the fastener, and the operating conditions of the process, it is possible to generate a wide range of products with different degrees of fibers projecting from the surface of the plastic thus providing a wide variety of products directed to many different applications.

Figure 6:
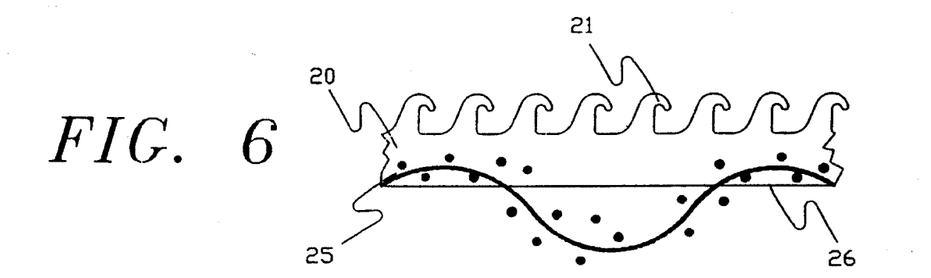
FIG. 6 is a schematic cross-sectional illustration of another product of the invention.

FIG. 6 is a cross-section diagram of yet another product of the present invention where an open, woven, textile reinforcing scrim 25 has been added into the nip 6 of the calender with a slight overfeed to create an excess of the backing fabric. Because of the open structure the plastic 20 has encapsulated large sections of the fabric scrim 25 yet sections of the fabric come to the surface 26 of the fastener. Such a combination can be used to add strength to the plastic tape, but also provide substantial modification of the plastic surface of the fastener.

Figure 7:
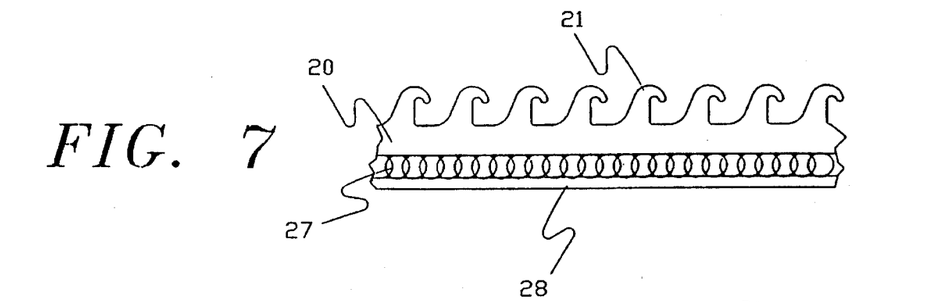
FIG. 7 is a schematic cross-sectional illustration of yet another form of the invention.

FIG. 7 again shows the plastic hook fastener 20 with upstanding hooks 21 laminated to a sheet of paper 27 containing on the surface thereof an adhesive layer 28. The adhesive may be any convenient type depending upon the intended use of the product. In this way it is possible to apply reactivatable adhesives, pressure sensitive adhesives or contact adhesives as the bottom layer of the laminate. Depending upon the nature of the adhesive laminate being applied, care must be taken to prevent the adhesive from being squeezed or distorted by the action of the pressure of the nip.

Figure 8:
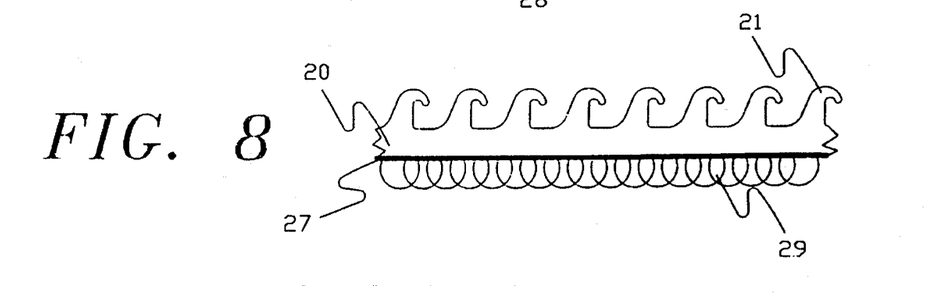
FIG. 8 is a schematic cross-sectional view wherein the bottom layer of the product is a loop fastener.

FIG. 8 shows yet another embodiment of a fastener product made according to the technique of the present invention wherein the backing layer 29 is the loop component side of a hook and loop fastener. Molten plastic resin 3 flows through die 2 and is forced into the pores of the backing of the loop component 29 continuously over the interface 27, encapsulating some of the yarns of the loop backing and integrally and continuously bonding the backing with the plastic sheet. In this way is created a product which is similar to the well known product created by adhesive bonding but which is created without foreign materials required to hold the layers together. Such back to back products are useful for the manufacturer of so called backstraps well known in the art of hook and loop materials.

Figure 9:
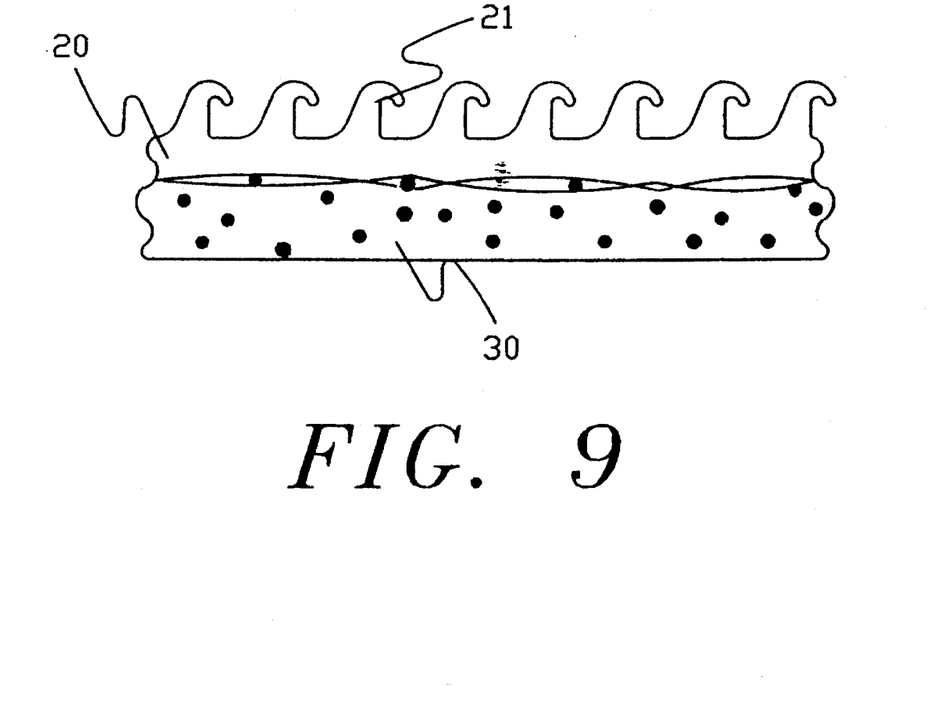
FIG. 9 is a schematic cross-sectional view wherein the product includes a layer of foam.
Figure 9A:
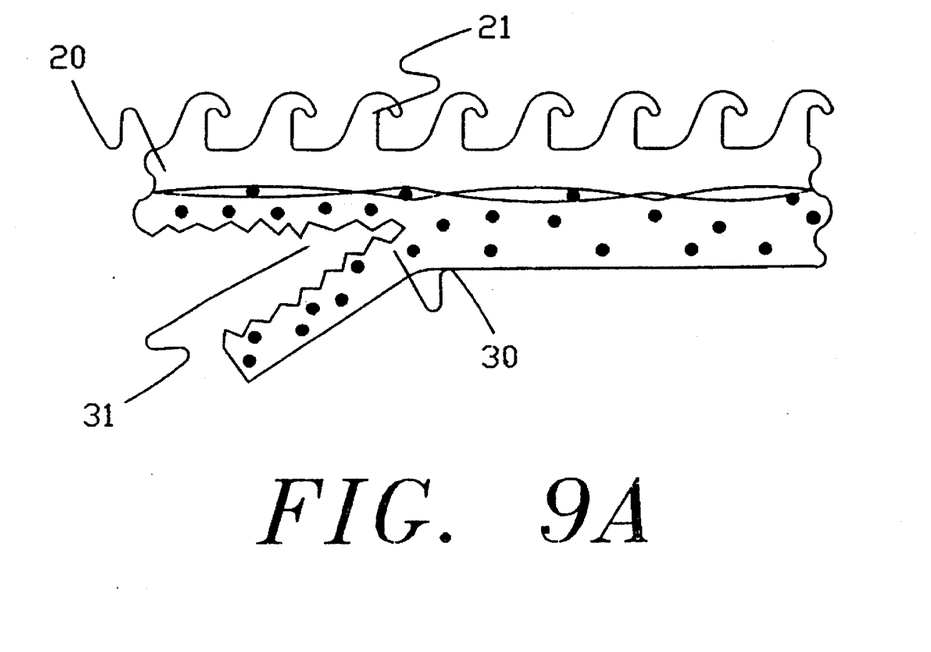
FIG. 9A shows how the foam layer of FIG. 9 can be sheared.

FIG. 9 shows an embodiment of the invention wherein the sheetlike material is a thin polyurethane foam 30. The thin foam 30 can be introduced into the nip of the calender as previously described. The surface of the foam is intimately bonded to the plastic of the striplike fastener 20. FIG. 9a shows the same arrangement as FIG. 9 with the foam 30 attached to the back of the fastener 20 but also illustrates what happens when attempting to remove the foam 30. The bond attaching the foam 30 to the plastic fastener 20 member is greater than the cohesive strength of the foam 30. When attempt is made to separate the foam from the back of the fastener 20, the foam 30 splits or tears within the body of the foam 31 leaving a substantial portion of the foam on the back of the plastic strip fastener.

The following examples will aid in further understanding the range and uniqueness of this invention.

EXAMPLE I

The apparatus described in U.S. Pat. No. 4,775,310 was set up to produce a plastic hook product, designated as hook type CFM-15 by the Velcro Group Corporation, using a nylon 12 resin, identified as resin L-2121 sold by the Hules Chemical Corporation. The melt temperature of the resin measured at the exit end of the extruder was 454° F. The die head temperature was 460° F. Line speed was 30 feet per minute; tape width was 10 inches; calendering pressure was 2000 # gage. The top roll temperature was 31° F.; the forming roll temperature was 55° F.; and the bottom roll temperature was 37° F. A roll of nonwoven fabric, PELLON® 850 a nylon nonwoven fabric sold by the Freudenberg Company, slit to a 10 inch width was introduced into the calender at the nip formed between the bottom and forming rolls. After a short initial start up period the fabric processed smoothly through the forming section without difficulty. The nonwoven fabric was intimately and continuously integrated into the plastic of the hook sheet. The laminate thus formed could not be separated into its constituents, one from the other, without destroying the fiber layer. The back of the hook product manifested a smooth, soft fibrous surface substantially different from the surface of the product without the laminated layer.

EXAMPLE II

The apparatus described in U.S. Pat. No. 4,775,310 was set up to produce a plastic hook product designated as hook type CEM-15 by the Velcro Group Corporation, using a co-polyester resin sold by the DuPont Company, a HYTREL® 8238 with 10% of a master batch fire retardant added to provide fire resistance to the final product. The melt temperature of the polymer, at the end of the extruder, was 475° F. and the die temperature was 476° F. The line speed was 30 feet per minute. A roll of spun-bonded nonwoven fabric, sold as REMAY® 2016, weighing 1.35 ounces per square yard with a thickness of 0.009 inches was slit to 10 inches width and introduced into the nip formed by the bottom and forming rolls of the device as described in Example I. The bottom roll temperature was 50° F., the forming roll temperature was 50° F. and the top roll temperature was 90° F. A tension of 100 pounds was exerted against the spun bonded fabric in order to prevent wrinkles from developing as the sheet passed into the nip of the calender, and the bottom roller was overdriven at 8% relative to the forming roller. The spunbonded fabric showed minor wrinkling and folding. The tension on the fabric was reduced to 35–40 pounds and the overfeed increased to 8.5% which reduced the wrinkles to an acceptable level.

The laminated product formed consisted of an integral bond between the plastic base of the hook sheet and the upper layer of the spunbonded fabric. The plastic forming the underside of the base of the hook tape was intimately merged with the interstices of the fabric. The spunbonded nonwoven layer could not be separated from the plastic without being destroying. Even when tearing the laminated sheet, the two layers would not separate. Because of the heavy weight of the spunbond, fibers were apparent on the under surface of the laminate and it was possible to disrupt and loosen fibers from the surface by vigorous rubbing. Even after substantial rubbing, however, a great quantity of fibers, primarily from the upper surface of the spunbond remain attached to the surface of the plastic.

EXAMPLE III

Exactly the same configuration as used in Example II was utilized but the spunbonded nonwoven used was a lighter weight version of Remay, designated as REMAY® style 2006, weighing 0.6 ounces per square yard with a thickness of 0.006 inches. In order to eliminate wrinkles and folds from the web, tension was reduced to 25 pounds and the same overfeed was used on the bottom roller. The product formed by this combination was similar to that of Example II but the mingling of the polymer into the interstices of the nonwoven was greater than in that example, but it was still possible to raise fibers from the surface by vigorous rubbing, and there were many fibers on the surface of the plastic projecting as a very fine fuzz above the surface.

EXAMPLE IV

Exactly the same configuration as used in Examples II and III were utilized but the spunbonded nonwoven used was even lighter then in the previous examples. The version of REMAY® in this example was designated as style 2250, weighing 0.5 ounces per square yard with a thickness of 0.004 inches. In order to eliminate wrinkles and folds from the web, tension was reduced to 20 pounds and the overfeed was increased to 9% on the bottom roller. The product formed by this combination was similar to those of Examples II and III but the mingling of the polymer into the interstices of the nonwoven was marginally greater than in Example III. This mingling was enhanced to the extent it was difficult to raise fibers from the surface by vigorous rubbing even when using a coin to abrade the surface. Yet it was possible to clearly see the fibers on the surface as an integral part of the surface and even projecting as a very fine fuzz from the surface.

EXAMPLE V

The apparatus described in U.S. Pat. No. 4,775,310 was set up to produce a plastic hook product, designated as hook type CFM-15 by the Velcro Group Corporation, using a polyester copolymer resin, Hytrel 8238, sold by the DuPont Company. The melt temperature of the polymer at the end of the extruder was 475° F. and the die temperature was 470° F. The line speed was 35 feet per minute and the tape width was 8–9 inches. The bottom roll temperature of the calender was 85° F., the forming roll was 40° F. and the top roll was 40° F. The calender pressure was 2500 pounds per lineal inch. A roll of tricot knitted fabric, sold by Velcro U.S.A. as Loop 3200, was slit to a width of 10 inches and fed into the calender at the nip formed by the bottom and forming rolls. As the hook product was formed the molten plastic backing flowed into the interstices of the knitted fabric to create a continuous interface formed by the fibers of the fabric interpenetrating and co-mingling with the solidified plastic resin, as illustrated schematically in FIG. 8. The layers forming the laminate between the plastic hook and the tricot fabric could not be separated without destroying the material making up the layer. In spite of the fact that Loop 3200 is a very open structure and the plastic from the hook portion of the laminate surrounded and encapsulated many of the ground yarns of the fabric, a sufficient number of loops remained extending upwards from the back of the product to enable hooks from the face to tightly engage when a tape of the product was turned such that the hooks were made to face the loops on the reverse side of the structure. In this manner was formed a product commonly known in the trade of hook and loop fasteners as back to back closure.

EXAMPLE VI

A sample of the Loop 3200 described in Example V was laminated to a ⅛ inch thick polyether urethane foam using flame lamination techniques well known in the art. The foam laminate thus formed was slit into a 10 inch wide roll of material which was fed into the hook forming device described in Example V. In this instance, however, the resin used was a polyethylene resin produced by the EXXON Chemical Company sold as Escorene LL6301.57. The melt temperature of the polymer at the end of the extruder was 420° F. and the die temperature was also 420° F. The calender pressure was 1250 pounds per lineal inch and the bottom roll temperature was 70° F., the forming roll temperature was 50° F. and the top roll temperature was 90° F. The line speed was 30 feet per minute. The foam side of the foam loop laminate was orientated to join with the plastic backing of the hook portion of the product and the loop portion faced outwardly from the bottom side of the product. A tenacious laminate resulted. The layers of the laminate could be separated by tearing the loop portion away from the plastic portion and the rupture between the layers occurred along the foam interface leaving a thin layer of foam on both the plastic and the loop. The force necessary to separate the layers was approximately 2 pounds per inch of width. The use of the foam as an intermediate layer yielded a product with soft loop backing which readily engaged the hooks on the face side of the product when turned in back to face relationship. The degree of contamination of the loop structure as occurred in Example II was essentially eliminated and the presence of the foam layer provided a soft cushioning to assist in the hook loop engagement.

EXAMPLE VII

Using the process configuration of Example VIa sample of a different loop, Velcro loop style 3610, was introduced in place of the loop used in Example V. Loop 3610 is a relatively heavy weight loop fabric weighing in the range of 8.02 to 9.95 ounces per square yard and having a nominal thickness range of 0.062 to 0.087 inches. The loop passed through the nip without difficulty using a tension of 100 pounds on the loop fabric, on overfeed on the bottom roll of 8% and a nip pressure of 1250 pounds per lineal inch. The plastic from the forming hooks mingled and encapsulated many of the fibers on the back side of the loop fabric thus creating a substantial bond holding the two layers together. Because Loop 3610 is such a substantial product it was possible to work loose one corner of the fabric from the plastic and by so doing test the bond strength of the laminate. The peel separating force averages 6 pounds to delaminate the two layers. The loop face of the Loop 3610 appeared to be unaffected by the laminating process and when the laminate was turned on itself such that the hooks engaged the loop in face to face relationship substantial gripping was achieved. The performance of the back to back closure thus formed was comparable to the performance of an independently formed hook product formed from the same polymer against Loop 3610.

EXAMPLE VIII

Using the process configuration of Example VI, a sample of a different loop, Velcro loop, style 3003, was introduced in place of the loop used in Example VII. Loop 3003 is a circular knit fabric with a substantially high loop pile on one surface, a relatively heavy weight of 9 ounces per square yard and a nominal thickness of 0.10 inches. The loop passed through the nip with some difficulty due to its bulk but the sample formed provided an extremely high degree of mingling, throughout the continuous interface, of the plastic resin with the backing fibers of the loop fabric. The bond was sufficiently strong. The two layers could not be separated for testing with destroying one or both of the layers. The pile fibers of the loop fabric did not appear to be affected by the laminating process and the closure performance of the back to back product thus formed was essentially the same as the closure performance of a comparable hook product produced independently tested against an independent loop of the same style.

EXAMPLE IX

The extrusion configuration of Examples VI through VIII using Escorene polyethylene was used to create yet another laminate in which the web introduced into the nip between the bottom roll and the forming roll was kraft paper. The paper bonded tightly to the back of the hook tape and could not be separated from the laminate without being destroyed. Penetration of the plastic into the paper was limited as shown by the ability to delaminate the paper from itself leaving a thin veil of paper fibers still attached to the plastic.

EXAMPLE X

In place of the standard kraft paper of Example IX, a length of kraft paper containing, on one surface, thereof, a water activable adhesive was introduced into the nip between the bottom roll and the forming roll with the adhesive side of the paper away from the plastic of the hook tape. The paper bonded tightly to the plastic of the hook, in a manner the same as described in Example IX. The paper could be torn from the laminate leaving a veil of fine paper fibers on the plastic surface. The interesting facet to this laminate was the fact the adhesive layer on the back of the hook tape could be activated by applying water to the adhesive and the adhesive used to attach the hook laminate to other objects. Small squares of the laminate so formed were activated as one would activate a postage stamp, with the tongue, and the small square of hook was easily attached to other objects. Appropriate loops attached to other objects were in this way releasably attached to each other.

EXAMPLE XI

The extrusion configuration of Examples VI through IX using Escorene polyethylene without any additives was used to create yet another laminate in which the web, introduced into the nip between the bottom roll and the forming roll, was a printed high density polyethylene film. The film bonded to the back of the hook tape but could be peeled from the laminate with a relatively light force of less than 0.5 pounds per inch of width. An especially interesting aspect of this laminate was that the printing could be read clearly through the slightly opaque face of the hook tape. The HD polyethylene printed message was in no way distorted and was only slightly less bright than the original printed message of the film.

EXAMPLE XII

In place of the printed polyethylene film of Example XI a page from a Rand-McNalley Road Atlas, made of paper with a road map printed on each side, was introduced into the nip between the bottom roller and the forming roller. The paper bonded tightly to the plastic polyethylene hook sheet that it could not be separated from the plastic without destroying the paper, The fine lines of the map were visible through the slightly opaque plastic film forming the hook tape. The paper sheet was printed on both sides and it was also possible to read the map on the back side of the hook sheet. The assembly with the printed matter on its reverse side could be attached to display boards with loop material covers. The combination formed an interesting method for affixing display material to other objects. Conversely, it is possible to make a display surface with the hooks extending outward from the display surface which can be read through the hook tape to which objects can be attached. In this way, the design portrayed on the display is read through the hooks and sections of the display can be covered up by attaching loop material to the exposed hooks.

EXAMPLE XIII

The apparatus as described in previous examples was set up to process polypropylene resin designated as Ferro HDPS 0250D, a fire retardant polypropylene resin from Ferro Chemical Company. The melt temperature was 400° F. and the die temperature was also 400° F. The line speed was 30 fpm and the nip pressure was 1500 pounds per linier inch. After the process was operating and forming an appropriate hook product a length of ether type polyurethane foam 0.065 inches thick, was introduced into the nip formed between the bottom roll and the forming roll. The foam bonded tenaciously to the plastic underside of the hook sheet and could not be removed without destroying the foam layer. In the process of being laminated, the foam was substantially compressed but remained tightly bonded to the polypropylene and provided a soft, resilient backing to the polypropylene hook tape which substantially changes the aesthetic and tactile response to the hook product.

We claim:

1. An elongated, strip-form hook and loop fastening member having a base member, a multiplicity of discretely molded hook-shaped engaging elements in the form of projections upstanding therefrom, and on the side of said fastening member opposite said hook-shaped elements, a fibrous surface configured for fastening engagement by said hook-shaped elements, said molded hook-shaped projections each having a stem supported at one end thereof on said base member and a radial extension on the unsupported end of said stem, said hook-shaped projections constructed to engage in fastening relationship with surface elements of said fibrous surface, said hook-shaped projections and said base member being unitarily formed from the same polymeric, resinous material, said fastening member comprising an in-situ laminate wherein said base member of resinous polymer is integrally and continuously joined over an extended region to form a continuous interface with a porous, fibrous, sheet-form material, without the use of adhesives, and on the side of said base member opposite the side containing said molded hook-shaped projections, said extended region at which said base member and sheet-form material are joined lying in part directly opposite effective upstanding molded hook-shaped projections, the resinous polymer which forms said base member on the side opposite said molded hook-shaped projections being co-mingled with and encapsulating at least some of the surface fibers on one side of said sheet-form fibrous material throughout the continuous interface while leaving fibrous surface elements on the opposite side of said sheet-form material free of said polymer and exposed for fastening engagement with hook-shaped projections of said fastening member.

2. The elongated strip-form hook-and-loop fastening member of claim 1 wherein the fibrous sheet-form material is a nonwoven fabric.

3. The elongated, strip-form hook-and-loop fastening member of claim 1 wherein the fibrous sheet-form material is a woven textile fabric.

4. The elongated, strip-form hook-and-loop fastening member of claim 1 wherein the fibrous sheet-form material is a loop-bearing fabric.

5. The elongated, strip-form hook-and-loop-type fastening member of claim 4 wherein the loop-bearing fabric is woven.

6. The elongated, strip-form hook-and-loop-type fastening member of claim 4 wherein the loop-bearing fabric is knitted.

* * * * *